US 8,334,485 B2

(12) United States Patent
Cox et al.

(10) Patent No.: US 8,334,485 B2
(45) Date of Patent: Dec. 18, 2012

(54) APPARATUS AND METHOD FOR CONTROLLING TEMPERATURE ON A COOKING APPLIANCE

(75) Inventors: Patrick Ryan Cox, Louisville, KY (US); David Lepie, Louisville, KY (US); Gregory Francis Gawron, Sr., Louisville, KY (US)

(73) Assignee: General Electric Company, Schenectady, NY (US)

(*) Notice: Subject to any disclaimer, the term of this patent is extended or adjusted under 35 U.S.C. 154(b) by 211 days.

(21) Appl. No.: 12/849,942

(22) Filed: Aug. 4, 2010

(65) Prior Publication Data

US 2012/0031893 A1 Feb. 9, 2012

(51) Int. Cl.
*H05B 1/02* (2006.01)

(52) U.S. Cl. .................. 219/494; 327/512

(58) Field of Classification Search .......... 219/494; 327/152, 512
See application file for complete search history.

(56) References Cited

U.S. PATENT DOCUMENTS

| | | | |
|---|---|---|---|
| 5,285,053 A | 2/1994 | Fowler | |
| 5,666,593 A | 9/1997 | Amico | |
| 6,928,379 B2 | 8/2005 | Fulton et al. | |
| 7,081,601 B2 | 7/2006 | Boyer et al. | |
| 7,479,006 B2 | 1/2009 | Newsom | |
| 2004/0144768 A1 | 7/2004 | Odorcic et al. | |
| 2007/0170167 A1* | 7/2007 | Jeong | 219/385 |
| 2008/0110449 A1 | 5/2008 | Brown et al. | |

* cited by examiner

*Primary Examiner* — Hoai V Ho
(74) *Attorney, Agent, or Firm* — Global Patent Operation

(57) ABSTRACT

An apparatus and a method for measuring temperature in a cooking appliance, both of which utilize a circuit for reading an input from a thermal resistive device. By including a processor and an amplifier in the circuit, embodiments reduce the number of processor pins required to modify the amplified input arising from the amplifier. In one embodiment, the processor utilizes a single processor pin, through which is distributed a control output corresponding to the input and modifying the operating parameters of the amplifier.

18 Claims, 4 Drawing Sheets

APPARATUS AND METHOD FOR CONTROLLING TEMPERATURE ON A COOKING APPLIANCE

BACKGROUND OF THE INVENTION

The subject matter disclosed herein relates generally to cooking appliances, and more particularly to embodiments of an apparatus and a method for temperature control on a cooking appliance.

Temperature control on cooking appliances such as stoves, ovens, and ranges typically requires amplification of a signal from a temperature sensor located in the heated cavity of the appliance. The amount of amplification is reflected by temperature bands, which indicate the amount of gain and shift applied to the signal. Conventional schemes select the appropriate temperature band using combinations of discrete elements such as resistors and transistors and multiple outputs of a corresponding processing device. The number of temperature bands is limited by the available combinations of elements and/or outputs allocated for the scheme.

Therefore it is advantageous to provide an improved scheme for temperature control that increases the number of temperature bands.

BRIEF DESCRIPTION OF THE INVENTION

In one embodiment, a cooking appliance with a cavity heated by a heating element. The cooking appliance comprises a temperature sensor under constant voltage, the temperature sensor in communication with the cavity. The cooking appliance also comprises an amplification circuit coupled to the temperature sensor, the amplification circuit comprising an amplifier for amplifying a first input from the temperature sensor. The cooking appliance also comprises a processor having an output pin coupled to the amplifier, wherein the first input is amplified by an amount corresponding to a control output conducted through the output pin from the processor.

In another embodiment, a method for monitoring temperature in a cavity of an oven. The method comprises steps for generating a first input respecting the temperature of the cavity and selecting a temperature band from the first input. The method also comprises a step for formulating a control output corresponding to the temperature band. The method further comprises a step for communicating the control output via a single output pin and a step for generating a second input in response to the output.

In yet another embodiment, a temperature control circuit comprises a temperature sensor under constant voltage. The temperature control circuit also comprises a voltage divider coupled to the temperature sensor, an operational amplifier coupled to a first leg of the voltage divider, and a processor coupled to a second leg of the voltage divider. The temperature control circuit defined wherein the processor has an output pin coupled to the operational amplifier, and wherein the processor is operatively configured to generate a control output that identifies a temperature band respecting the operating parameters of the operational amplifier.

BRIEF DESCRIPTION OF THE DRAWINGS

Reference is now made briefly to the drawings, in which.

Like reference characters designate identical or corresponding components and units throughout the several views, which are not to scale unless otherwise indicated.

DETAILED DESCRIPTION OF THE INVENTION

A temperature control circuit is described that is useful to regulate the temperature in cooking appliances such as ovens, ranges, stoves, and related cooking devices. Exemplary temperature control circuits are often incorporated into more complex control structures, which facilitate the operation of the cooking appliance. Depending on factors such as model type and the sophistication of the cooking appliance, the control structure also includes processors configured to regulate a multitude of functions and options that, in addition to temperature control, include cleaning functions, the operation of multi-functional displays, and myriad cooking functions for broiling, baking, and convection cooking.

Because space in the housing of these cooking appliances is limited, however, making these and other functions and options available to the consumer is difficult, competing instead with other interests such as design parameters that desire to maintain or even reduce the footprint of the control structure. Embodiments of the temperature control circuit described below address each of these interests by reducing the number of pins on the processor that are necessary for regulating temperature. This reduction makes pins available for use in connection with other options and functions without the need to modify the control structure such as through the addition of components, circuitry, and the like. Moreover, in addition to maintaining the overall footprint of the control structure, the temperature control circuit also improves the temperature control function such as by increasing the resolution and accuracy of the temperature measurement.

Figure 1:
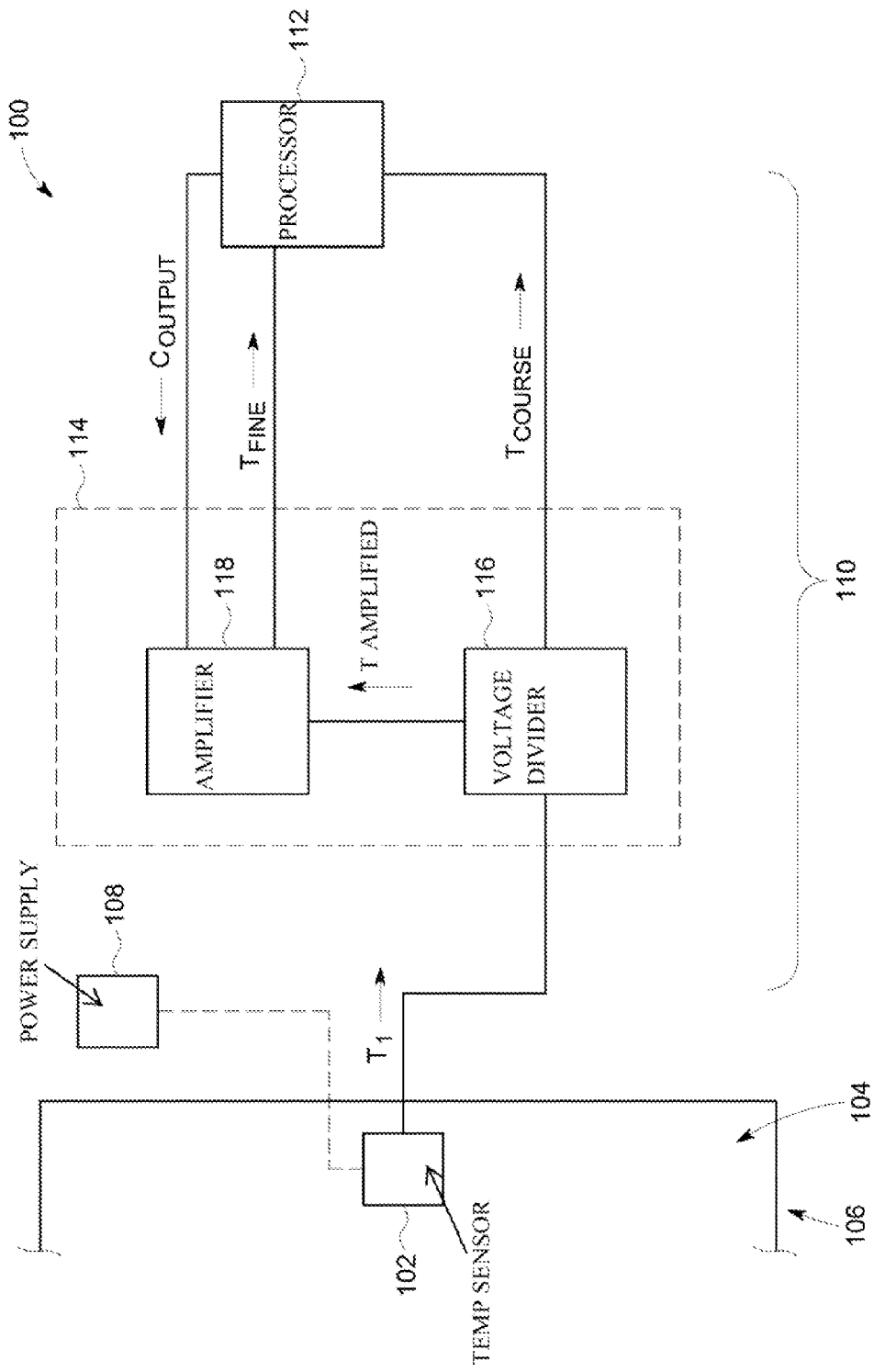
FIG. 1 is a schematic diagram of an exemplary embodiment of a temperature control circuit.

Further understanding of these concepts can be had in connection with the schematic block diagram of FIG. 1, in which there is depicted an exemplary embodiment of a temperature control circuit 100. In the present example, the temperature control circuit 100 includes a temperature sensor 102 such as a resistive thermal device (RTD) that is located in communication with a heated cavity 104 of an oven 106. The temperature sensor 102 is coupled to a power supply 108, with one example providing to the temperature sensor 102 a constant voltage with a nominal value of 5 VDC. The temperature control circuit 100 also includes a variety of circuitry 110, which includes a processor circuit 112 and an input circuit 114 coupled to the processor circuit 112. In one embodiment, the input circuit 114 includes a voltage divider 116 and an amplification circuit 118.

At a relatively high level, configurations of the circuitry 110 include one or more groups of electrical circuits that are each configured to operate, separately or in conjunction with other electrical circuits, to sense the temperature in the heated cavity 104. The electrical circuits of the circuitry 110 can communicate with other circuits (and/or devices), which execute high-level logic functions, algorithms, as well as firmware and software instructions. Exemplary circuits of this type include, but are not limited to, discrete elements such as resistors, transistors, and capacitors, as well as microprocessors and other logic devices such as field programmable gate arrays ("FPGAs") and application specific integrated circuits ("ASICs"). While all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

The electrical circuits of the circuitry 110, and more particularly the processor circuit 112, may be implemented in a manner that can physically manifest theoretical analysis and logical operations. This implementation is useful to facilitate resolution of inputs, e.g., the inputs of the temperature sensor 102. These electrical circuits can replicate in physical form an algorithm, a comparative analysis, and/or a decisional logic tree, each of which operates to assign the output and/or a value to the output that correctly reflects one or more of the nature, content, and origin of the changes that occur and that are reflected by the relative inputs from, e.g., the input circuit 114.

In one implementation, rather than utilizing a single input from the temperature sensor 102, the temperature control circuit 100 is configured to analyze a plurality of inputs. These inputs include in one example a temperature input arising from the temperature sensor 102 and an amplified input that is the amplified version of the temperature input. These two inputs are compared such as to determine a measured difference in temperature readings corresponding, respectively, to the temperature input and the amplified input. In one embodiment, a measured difference that exceeds about 50° C. is flagged as an error.

This configuration overcomes issues with resolution consistent with single input circuitry, such as issues in which the temperature input may not provide enough resolution over the range of temperatures for the heated cavity 104. Amplification of the temperature input to the amplified input and subsequent comparison of the amplified input and the temperature input, however, may be utilized to more accurately analyze the temperature of the heated cavity 104. In one implementation, this comparison provides a means to monitor operation of, e.g., the oven, so as to identify failure of one or more components. Such failure can cause calibration issues, and more particularly, failure of the temperature sensor may lead to further calibration issues in self-cleaning ovens.

By way of example, and as depicted in FIG. 1, the temperature sensor 102 generates a temperature input $T_1$ respecting the temperature in the heated cavity 104. This temperature input $T_1$ is received by the input circuit 114 such as at the voltage divider 116. The voltage divider 116 in turn generates a pair of divided inputs that include a course temperature input $T_{course}$, having parameters similar to the temperature input $T_1$, and an amplified temperature input $T_{amplified}$. The latter, i.e., the amplified temperature input $T_{amplified}$, is received by the amplified circuit 118, which generates a fine temperature input $T_{fine}$, which is in effect the amplified version of temperature input $T_1$.

Exemplary configurations of the processor circuit 112 are coupled to the input circuit 114 and more particularly to the amplified circuit 118. This coupling permits a control output $C_{output}$ from the processor circuit 112 to influence the parameters of the fine temperature input $T_{fine}$. The control output $C_{output}$ is selected in response to the course temperature input $T_{course}$ that is received by the processor circuit 112. In one example, the control output $C_{output}$ changes the operation of the amplified circuit 118 such as by setting one or more operating parameters that effect the amplification of the amplified temperature input $T_{amplified}$ to the fine temperature input $T_{fine}$.

Figure 2:
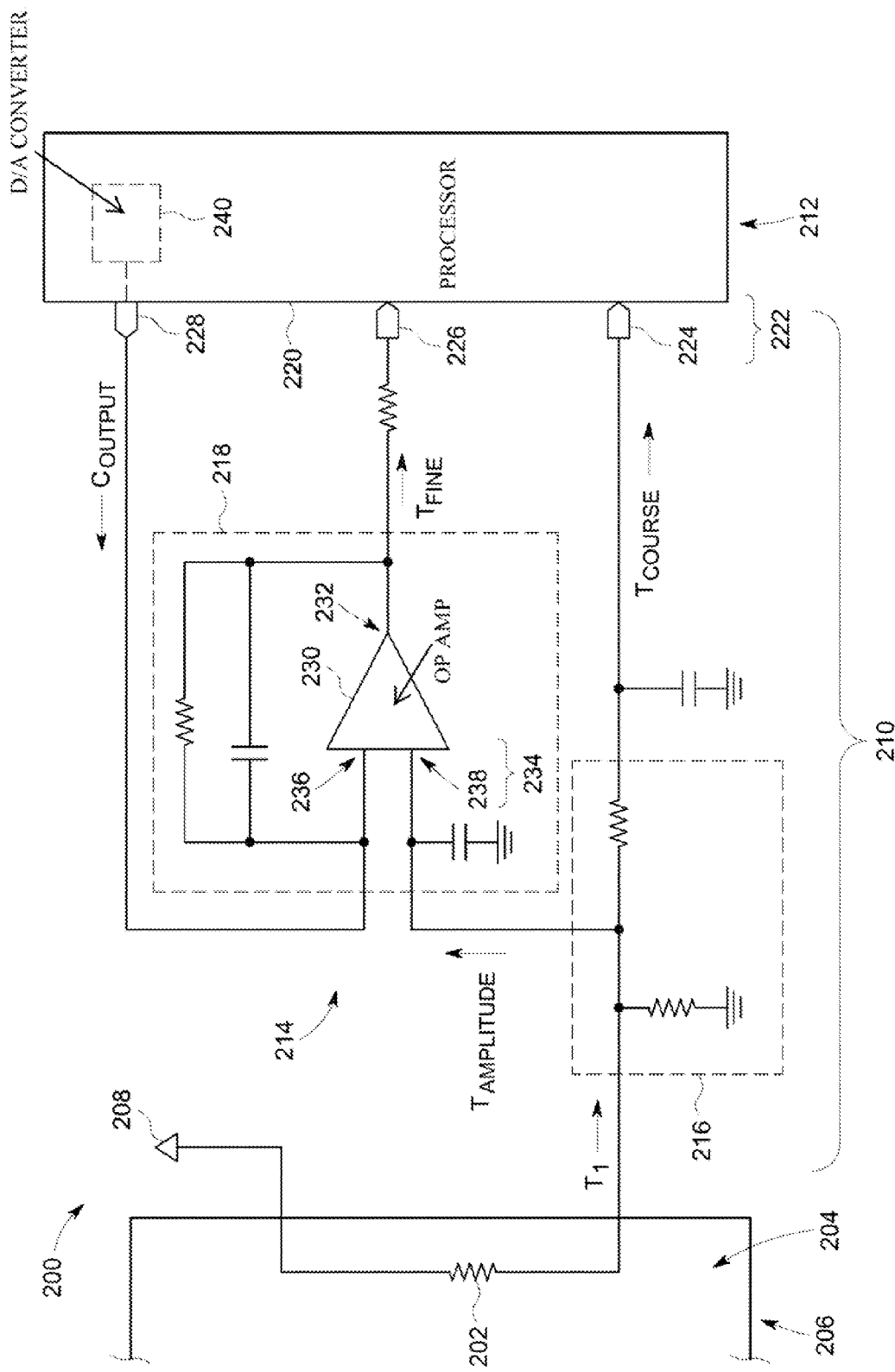
FIG. 2 is a schematic diagram of another exemplary embodiment of a temperature control circuit.

Referring now to FIG. 2, there is depicted another exemplary embodiment of a temperature control circuit 200 in which elements such as resistors and capacitors are configured so as to affect the concepts discussed above. Like numerals are used to identify like components as between FIGS. 1 and 2, wherein the numerals are increased by 100 (e.g., 100 is now 200 in FIG. 2). For example, the temperature control circuit 200 includes a temperature sensor 202 in a heated cavity 204 of an oven 206. The temperature control circuit 200 also includes a power supply 208, and circuitry 210 with a processor circuit 212 and an input circuit 214, the latter, i.e., the input circuit 214, being configured with a voltage divider 216 and an amplification circuit 218.

In one embodiment, the temperature control circuit 200 includes a microprocessor 220 such as the ASIC and/or FPGA described above. The microprocessor 220 includes a plurality of processor pins 222, and particular to the discussion below the processor pins 222 are configured with a course input pin 224, a fine input pin 226, and a control output pin 228. The temperature control circuit 200 also includes an operational amplifier 230 with an amplifier output 232 coupled to the fine input pin 226. The operational amplifier 230 also includes amplifier inputs 234 such as a control input 236, which is coupled to the control output pin 228, and an amplified input 238 that is coupled to the voltage divider 216. The temperature control circuit 200 also includes a digital-to-analog converter 240, which in the present example is located internal to the microprocessor 220.

Microprocessors of the type used as the microprocessor 220 are configured to provide an output such as the control output $C_{output}$ via the control output pin 228. This output is often digitized or in the form of a digital output or digital signal such as a voltage between 0 and Vcc, wherein Vcc is the voltage supplied to the microprocessor from the power supply (e.g., power supply 108). In the present example, Vcc is 5 V dc, but can vary in connection with the various configurations of, e.g., the control structure discussed above. For compatibility with the operational amplifier 230, the output is converted to an analog consistent voltage. The conversion can be achieved by providing the D/A converter 240. Exemplary microprocessors are configured for such conversion such as by including the D/A converter 240 therein (as depicted in FIG. 2) or otherwise being configured with functionality to provide the output in the form for use by, e.g., the operational amplifier 230. Other embodiments of the temperature control circuit 200, however, are also contemplated in which the D/A converter (or the digital-to-analog functionality) is located external to the microprocessor 220.

The microprocessors are likewise configured via the construction and compilation of internal circuitry and/or implementation of executable instructions to select the output from one or more inputs. These inputs include, but are not limited to, the course temperature input $T_{course}$ received via the course input pin 224. By way of example, the microprocessor selects operating parameters of the operational amplifier in response to the course temperature input $T_{course}$ and formats the output (e.g., the control output $C_{output}$) to modify the operation amplifier in accordance with the selected operating parameters. The operating parameters are used to tune the fine temperature input $T_{fine}$ received at the fine input pin 226. In one example, the number of processor pins 222 to generate the fine temperature input $T_{fine}$ does not exceed three. In another example, the operating parameters include the gain and shift applied by the operation amplifier. Other operating parameters are also available such as those parameters consistent with operational amplifiers of the type contemplated herein.

In one embodiment, the operating parameters correspond to one or more temperature bands. These temperature bands identify particular parameters of the fine temperature input $T_{fine}$ that are analyzed by the microprocessor 220 to reflect the actual temperature of the heated cavity 104. The number of temperature bands can vary in connection with the selected configuration of the microprocessor, with one construction of the temperature control circuit 200 providing more than the 8 temperature bands found in conventional construction of temperature sensing circuitry, which utilize discrete elements such as resistors and transistors. Likewise in another construction the number of temperature bands is a function of the binary combination of bits available in the D/A converter (e.g., D/A converter 240 (FIG. 2)). In one example, the number of temperature bands can be at least about 128, while other examples can utilize at least about 256 temperature bands.

Figure 3:
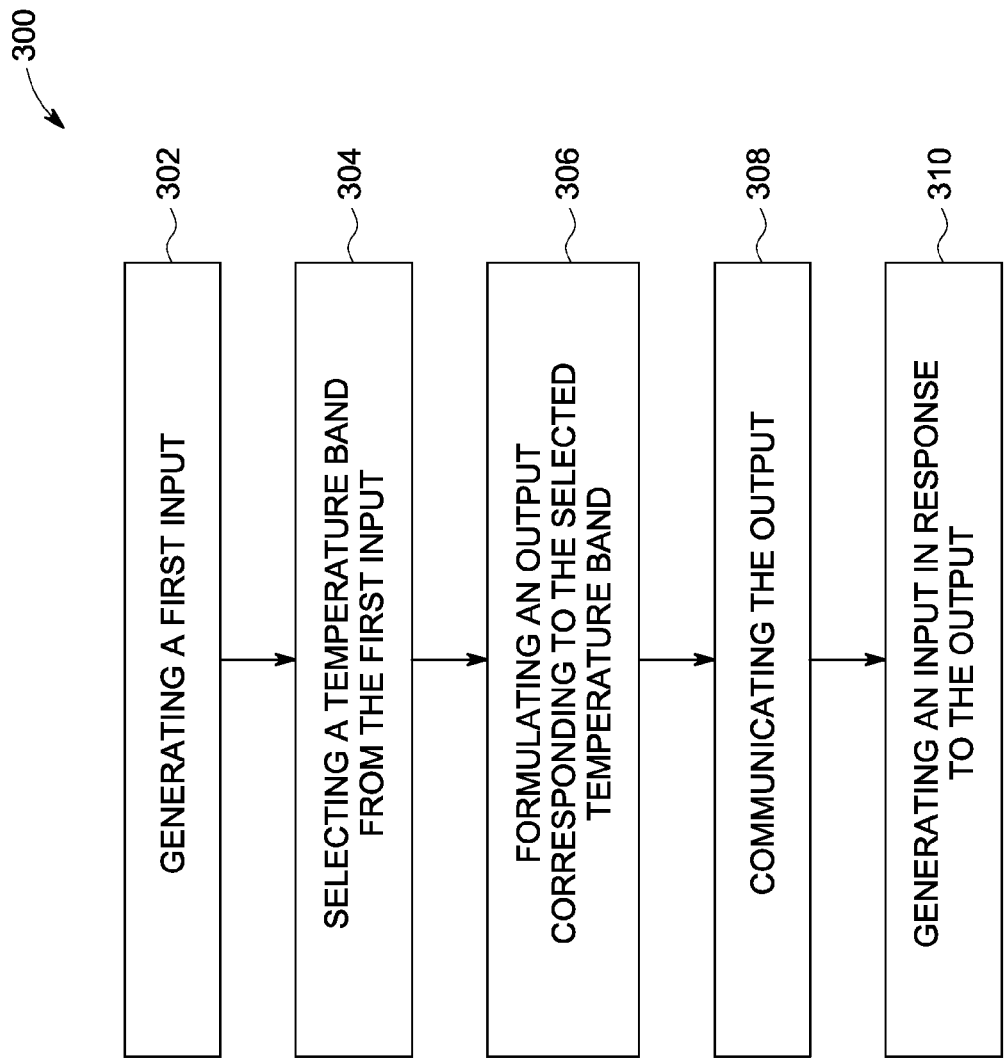
FIG. 3 is a flow diagram of an exemplary embodiment of a method for selecting a temperature band in a temperature control circuit, such as the temperature control circuits of FIGS. 1 and 2.

To further illustrate the selection of the temperature bands by way of the temperature control circuits discussed above, referenced can now be had to the exemplary embodiment of a method 300 of FIG. 3. The method 300 includes steps 302, 304, 306, 308, and 310, the execution of which is useful to controlling the temperature of an oven. In one embodiment, the method 300 includes a step 302 for generating a first input respecting the temperature of a heated cavity of the oven. The method 300 also includes a step 304 for selecting a temperature band from the first input and a step 306 for formulating an output corresponding to the selected temperature band. The method further includes a step 308 for communicating the output via a single pin such as the control output pin 228 (FIG. 2) and a step 310 for generating a second input in response to the output.

In one embodiment, one or more processors such as the processor circuit 112 and the microprocessor 220 execute one or more of the steps outlined above. This execution can be in the form of executed instructions such as are consistent with software and/or firmware instructions. By way of example, these instructions can include operations that compare the various inputs such as the course temperature input $T_{course}$ and the fine temperature input $T_{fine}$. Differences between these inputs can be used to select and/or adjust the output, or in one example the difference is used to change the operating parameters of the operational amplifier. These changes are made in response to one or more of the temperature bands, thus providing real-time adjustment to the resolution and accuracy of the temperature control circuit as described herein.

Figure 4:
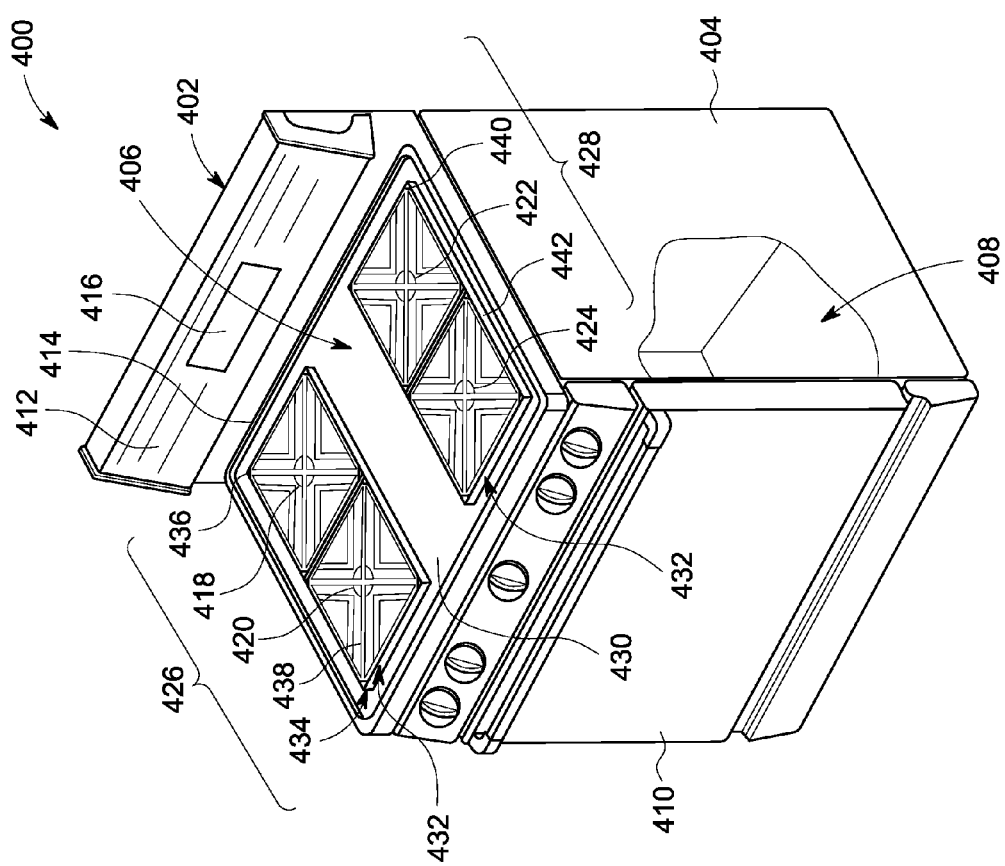
FIG. 4 is a perspective view of an exemplary cooking appliance, on which is incorporated a temperature control circuit, such as the temperature control circuits of FIGS. 1 and 2.

Implementation of the method 300 of FIG. 3 and the temperature control circuits 100 and 200 of FIGS. 1 and 2 respectively, is relevant with respect to the exemplary embodiment of a cooking appliance 400 in FIG. 4. The cooking appliance 400 is depicted in the form of a free-standing range 402 including an outer body or cabinet 404 that includes a generally rectangular cooktop 406. A cavity 408 is positioned below cooktop 406 and has a front-opening access door 410. The cavity 408 can include a heating element (not shown) disposed therein, wherein operation of the heating element changes the temperature of the cavity 408 such as during cooking. A range backsplash 412 extends upward from a rear portion 414 of cooktop 406 and contains a multi-functional display 416 for selecting operative features of heating elements for cooktop 406 and/or the cavity 408. Cooking appliance 400 is provided by way of illustration rather than limitation, and accordingly there is no intention to limit application of the present invention to any particular appliance or cooktop, such as range 402 or cooktop 406. In addition, it is contemplated that temperature control circuits discussed herein are applicable to many types of cooking appliances including, but not limited to, electric, gas, and duel fuel cooking appliances, e.g., a gas cooktop with an electric oven.

Cooktop 406 includes four surface burners 418, 420, 422, and 424, which are positioned in spaced apart pairs 426 and 428 positioned adjacent each side of cooktop 406. In one embodiment, each pair of burners 426 and 428 is surrounded by a recessed area (not shown in FIG. 4) of cooktop 406. The recessed areas are positioned below an upper surface 430 of cooktop 406 and serve to catch any spills on cooktop 406. Each burner 418, 420, 422, and 424 extends upwardly through an opening in cooktop 406, and a grate assembly 432 is positioned over each respective pair of burners 426 and 428. Each grate assembly 432 includes a respective frame 434 and separate supporting grates 436, 438, 440, and 442 are positioned above the cooktop recessed areas and overlie respective burners 418, 420, 422, and 424.

Noted is that the configuration the temperature control circuits of the present disclosure are compatible with the electric, gas, and duel-fuel type variations of the cooking appliance 400. Moreover, whereas cooktop 406 includes various components that might be configured for certain types of variations, it is equally as likely that one or more of these components would not be useful in connection with other variations. Examples of these variations include, but are not limited to, gas burners, electric burners, induction burners, and any combinations, derivations, and modifications thereof.

In one embodiment, temperature control circuits such as temperature control circuits 100 and 200 are coupled to the cavity 408. RTD temperature sensors can communicate with the interior of the cavity 408, providing the temperature input (e.g., the temperature input $T_1$). In another embodiment, temperature sensors such as the temperature sensor 102 and 202 are coupled to the cooktop 406 such as in thermal communication with one or more of the burners (e.g., burners 418, 420, 422, and 424). This thermal communication permits the temperature sensors to monitor temperature of (or proximate) the corresponding burner, thus providing the temperature input. Remaining portions of the temperature control circuit and related control structure are configure to operate in conjunction with the selected burner to maintain, monitor, and regulate temperature as disclosed and described herein.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

This written description uses examples to disclose embodiments of the invention, including the best mode, and also to enable any person skilled in the art to practice the invention, including making and using any devices or systems and performing any incorporated methods. The patentable scope of the invention is defied by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A cooking appliance with a cavity heated by a heating element, said cooking appliance comprising:
   a temperature sensor under constant voltage, the temperature sensor in communication with the cavity;
   an amplification circuit coupled to the temperature sensor, the amplification circuit comprising an amplifier having a control input and for amplifying a first input from the temperature sensor to generate an amplifier output;
   a voltage divider circuit coupled to the temperature sensor, the voltage divider circuit providing a course temperature output; and
   a processor having a fine input pin connected to the amplifier output and a course input pin connected to the course temperature output, the processor having a control output pin coupled to the control input of the amplifier, wherein the first input is amplified by an amount corresponding to a control output conducted through the output pin from the processor.

2. A cooking appliance according to claim 1, wherein the temperature sensor comprises a resistive thermal device.

3. A cooking appliance according to claim 1, wherein the control output indicates a temperature band, and wherein the temperature band is selected from one of at least 8 temperature bands.

4. A cooking appliance according to claim 3, wherein the temperature band is selected from an input respecting the course temperature output representing the temperature of the cavity.

5. A cooking appliance according to claim 1, wherein the control output sets the gain and shift of the amplifier.

6. A cooking appliance according to claim 1 further comprising a digital-to-analog converter coupled to the output pin, wherein the control output is an analog.

7. A cooking appliance according to claim 6, wherein the digital-to-analog converter is internal to the processor.

8. A cooking appliance according to claim 1, wherein the number of output processor pins to generate the first input does not exceed three.

9. A method for monitoring temperature in a cavity of an oven, said method comprising:
   generating, by an amplification circuit, a first input respecting the temperature of the cavity;
   generating, by a voltage divider, a course input respecting a course temperature of the cavity;
   selecting, by a processor, a temperature band by comparing the first input to the course input;
   formulating a control output corresponding to the temperature band;
   communicating, by the processor, the control output via a single output pin; and
   generating, by the amplification circuit, a second input in response to the output.

10. A method according to claim 9, further comprising converting the control output from digital to analog.

11. A method according to claim 9, wherein the temperature band identifies a set of amplified parameters for the second input.

12. A method according to claim 11, wherein the amplified parameters comprise one or more of gain and shift, and wherein the gain and shift are conveyed by the control output as an analog voltage.

13. A method according to claim 9, wherein the temperature band selected from one of at least 8 temperature bands.

14. A method according to claim 9, wherein the number of processor pins required to generate the second input does not exceed three pins.

15. A temperature control circuit, comprising:
   a temperature sensor under constant voltage;
   a voltage divider coupled to the temperature sensor;
   an operational amplifier coupled to a first leg of the voltage divider; and
   a processor coupled to a second leg of the voltage divider, wherein the processor has a fine input pin coupled to an output of the operational amplifier and a course input pin coupled to a second leg of the voltage divider and a control output pin coupled to the operational amplifier, and wherein the processor is operatively configured to generate a control output for input to the operational amplifier that identifies a temperature band respecting the operating parameters of the operational amplifier.

16. A temperature control circuit according to claim 15, further comprising a digital-to-analog converter coupled to the control output pin.

17. A temperature control circuit according to claim 15, wherein the operating parameters include gain and shift, and wherein the gain and shift are conveyed by the control output as an analog voltage.

18. A temperature control circuit according to claim 15, wherein the number of processor pins required to generate an input from the operation amplifier does not exceed three.

* * * * *